US012764747B2

(12) United States Patent
Zuo et al.

(10) Patent No.: US 12,764,747 B2
(45) Date of Patent: Oct. 13, 2026

(54) DATA TRANSMISSION METHOD, APPARATUS, DEVICE AND STORAGE MEDIUM

(71) Applicant: GUANGDONG OPPO MOBILE TELECOMMUNICATIONS CORP., LTD., Dongguan (CN)

(72) Inventors: Zhisong Zuo, Dongguan (CN); Shengjiang Cui, Dongguan (CN); Weijie Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 323 days.

(21) Appl. No.: 18/410,723

(22) Filed: Jan. 11, 2024

(65) Prior Publication Data

US 2024/0147481 A1 May 2, 2024

Related U.S. Application Data

(63) Continuation of application No. PCT/CN2021/118874, filed on Sep. 16, 2021.

(51) Int. Cl.

| | |
|---|---|
| ***H04W 72/21*** | (2023.01) |
| ***H04L 1/00*** | (2006.01) |
| ***H04W 72/1268*** | (2023.01) |

(52) U.S. Cl.

CPC ........... *H04W 72/21* (2023.01); *H04L 1/0009* (2013.01); *H04W 72/1268* (2013.01)

(58) Field of Classification Search

CPC .... H04L 1/00; H04L 1/0009; H04W 72/1268; H04W 72/21

See application file for complete search history.

(56) References Cited

U.S. PATENT DOCUMENTS

| | | | |
|---|---|---|---|
| 10,644,847 | B2 | 5/2020 | Yoshimura |
| 10,924,211 | B2 | 2/2021 | Wang |
| 11,038,540 | B2 | 6/2021 | Ye |
| 2017/0135114 | A1 | 5/2017 | Hwang |

(Continued)

FOREIGN PATENT DOCUMENTS

| | | | |
|---|---|---|---|
| CN | 107431955 | A | 12/2017 |
| CN | 108242972 | A | 7/2018 |
| CN | 112235089 | A | 1/2021 |

OTHER PUBLICATIONS

NTT Docomo, Inc., “TB processing over multi-slot PUSCH”, 3GPP TSG RAN WG1 #106-e, R1-2107873, e-Meeting, Aug. 16-27, 2021, total pp. 8 (Year: 2021).*

(Continued)

*Primary Examiner* — Shah M Rahman
(74) *Attorney, Agent, or Firm* — Ladas & Parry LLP

(57) ABSTRACT

A data transmission method and apparatus, a device, and a storage medium. In the method, coded bits corresponding to each of at least one code block (CB) are acquired. Bit selection is performed on the coded bits corresponding to each of the at least one CB based on at least one bit selection parameter, to obtain transmission bits corresponding to each of the at least one CB. A first transport block (TB) is transmitted in n time units, wherein the first TB is obtained based on the transmission bits corresponding to each of the at least one CB, and n is a positive integer.

20 Claims, 5 Drawing Sheets

(56) References Cited

U.S. PATENT DOCUMENTS

| | | | | |
|---|---|---|---|---|
| 2018/0159707 | A1 | 6/2018 | Onggosanusi | |
| 2019/0207734 | A1* | 7/2019 | Yang | H04L 1/1864 |
| 2019/0229861 | A1 | 7/2019 | Yoshimura | |
| 2019/0319743 | A1 | 10/2019 | Wang | |
| 2020/0235759 | A1 | 7/2020 | Ye | |
| 2020/0389345 | A1 | 12/2020 | Onggosanusi | |
| 2021/0337428 | A1* | 10/2021 | Li | H04W 72/0446 |
| 2021/0384922 | A1 | 12/2021 | Ye | |
| 2022/0045789 | A1* | 2/2022 | Karmoose | H04L 1/0041 |
| 2022/0303988 | A1* | 9/2022 | Yi | H04L 5/0044 |
| 2022/0330232 | A1* | 10/2022 | Sridharan | H04L 1/0041 |
| 2023/0188277 | A1* | 6/2023 | Cheng | H04L 1/0041 370/329 |
| 2025/0089054 | A1* | 3/2025 | You | H04W 72/232 |
| 2025/0097908 | A1* | 3/2025 | Yamamoto | H04W 72/04 |

OTHER PUBLICATIONS

International Search Report in the international application No. PCT/CN2021/118874, mailed on Jun. 17, 2022. 7 pages with English translation.

Written Opinion of the International Search Authority in the international application No. PCT/CN2021/118874, mailed on Jun. 17, 2022. 9 pages with English translation.

Sharp. R1-2107800, “Transport block processing over multi-slot PUSCH”, 3GPP TSG RAN WG1 #106-e, Aug. 7, 2021 (Aug. 7, 2021), sections 1-4. 7 pages.

Ericsson. R1-2107560, “TB Processing over Multi-Slot PUSCH”, 3GPP TSG-RAN WG1 Meeting # 106-e, Aug. 7, 2021 (Aug. 7, 2021), sections 1-2. 17pages.

3GPP TS 38.214 V16.2.0 (Jun. 2020), 3rd Generation Partnership Project; Technical Specification Group Radio Access Network; NR; Physical layer procedures for data, (Release 16). the whole document. 163 pages.

3GPP TS 38.214 V16.1.0 (Mar. 2020), 3rd Generation Partnership Project; Technical Specification Group Radio Access Network; NR; Physical layer procedures for data, (Release 16). section: 6.1.2. 151 pages.

3GPP TSG RAN Meeting #86, RP-193240, Sitges, Spain, Dec. 9-12, 2019, Source: China Telecom, Title: New SID on NR coverage enhancement, Document for: Approval, Agenda Item: 9.1.1, section: Justification and Objectives, 4 pages.

* cited by examiner

DATA TRANSMISSION METHOD, APPARATUS, DEVICE AND STORAGE MEDIUM

CROSS REFERENCE TO RELATED APPLICATIONS

This is a continuation of International Application No. PCT/CN2021/118874 filed on Sep. 16, 2021, and entitled “DATA TRANSMISSION METHOD AND APPARATUS, DEVICE, AND STORAGE MEDIUM”, the disclosure of which is incorporated therein by reference in its entirety.

TECHNICAL FIELD

The embodiments of the disclosure relates to the technical field of communications, and in particular to a method, an apparatus, and a device for data transmission and a storage medium.

BACKGROUND

In order to improve the reliability of data transmission, 3rd generation partnership project (3GPP) has introduced a data repetition transmission mechanism in new radio (NR) systems.

The data repetition transmission mechanism means that a sending end uses a same symbol allocation scheme in multiple consecutive slots to transmit a same transport block (TB) many times. When a length of the TB is relatively large, the sending end needs to segment the TB, code each segment of the segmented TB, and put the coded data into a ring buffer. After that, during each transmission process, the sending end performs rate matching on the coded data of TB based on a redundant version (RV) to determine data to be transmitted to a receiving end in this transmission process.

However, the rate matching manner of data in the data repetition transmission mechanism needs further discussion and research.

SUMMARY

The disclosure provides a method, an apparatus, and a device for data transmission and a storage medium. The technical solution includes the following contents.

In an aspect, an embodiment of the disclosure provides a method for data transmission, including the following operations.

Coded bits corresponding to each of at least one code block (CB) are acquired.

Bit selection is performed on the coded bits corresponding to each of the at least one CB based on at least one bit selection parameter, to obtain transmission bits corresponding to each of the at least one CB.

A first transport block (TB) is transmitted in n time units, where the first TB is obtained based on the transmission bits corresponding to each of the at least one CB, and n is a positive integer.

In another aspect, an embodiment of the disclosure provides an apparatus for data transmission, including an acquisition module, a selection module, and a transmission module.

The acquisition module is configured to acquire coded bits corresponding to each of at least one code block (CB).

The selection module is configured to perform bit selection on the coded bits corresponding to each of the at least one CB based on at least one bit selection parameter, to obtain transmission bits corresponding to each of the at least one CB.

The transmission module is configured to transmit a first transport block (TB) in n time units, where the first TB is obtained based on the transmission bits corresponding to each of the at least one CB, and n is a positive integer.

In yet another aspect, an embodiment of the disclosure provides a terminal device, including a processor and a transceiver connected to the processor.

The processor is configured to acquire coded bits corresponding to each of at least one code block (CB).

The processor is further configured to perform bit selection on the coded bits corresponding to each of the at least one CB based on at least one bit selection parameter, to obtain transmission bits corresponding to each of the at least one CB.

The transceiver is configured to transmit a first transport block (TB) in n time units, where the first TB is obtained based on the transmission bits corresponding to each of the at least one CB, and n is a positive integer.

In yet another aspect, an embodiment of the disclosure provides a computer-readable storage medium, having stored thereon a computer program, and the computer program is executed by a processor of a terminal device to implement the above data transmission method.

In yet another aspect, an embodiment of the disclosure provides a chip, including at least one of: a programmable logic circuit, or program instructions; and the chip is executed on a terminal device to implement the above data transmission method.

In yet another aspect, an embodiment of the disclosure provides a computer program product, and the computer program product is executed on a terminal device to implement the above data transmission method.

BRIEF DESCRIPTION OF THE DRAWINGS

In order to provide a clearer explanation of the technical solution in the embodiments of the disclosure, the drawings needed in the description of the embodiments are briefly introduced below. It is apparent that the drawings described below are only some embodiments of the disclosure, and other drawings may be obtained from these drawings without creative effort for those of ordinary skill in the art.

DETAILED DESCRIPTION

In order to make the purpose, technical solution and advantages of the disclosure clearer, a further detailed description of the implementation of the disclosure is provided below with reference to the drawings.

A network architecture and service scenarios described in the embodiments of the disclosure are intended to provide a clearer explanation of the technical solution in the embodiments of the disclosure, and do not constitute a limitation to the technical solution provided by the embodiments of the disclosure. It may be understood by those skilled in the art that with the evolution of the network architecture and the emergence of new service scenarios, the technical solution provided by the embodiments of the disclosure is also applicable to similar technical problems.

Figure 1:
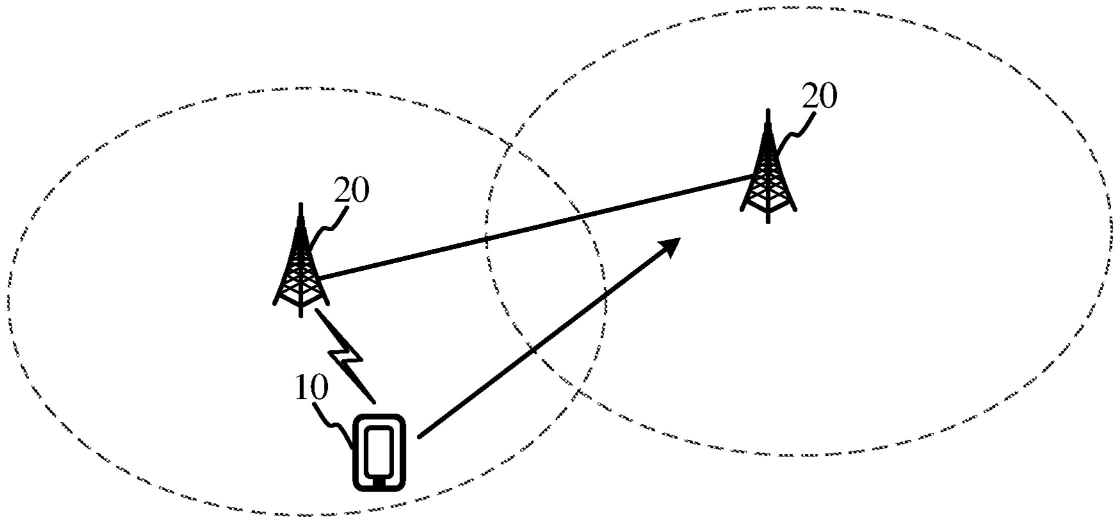
FIG. 1 is a schematic diagram of a system architecture according to an embodiment of the disclosure.

Please refer to FIG. 1, which shows a schematic diagram of a system architecture according to an embodiment of the disclosure. The system architecture may include a terminal device 10 and network devices 20.

A number of the terminal device 10 is generally multiple, and one or more terminal devices 10 may be distributed in a cell managed by each network device 20. The terminal device 10 may include various handheld devices, vehicle mounted devices, wearable devices, computing devices, or other processing devices connected to wireless modem with a wireless communication function, and various forms of user equipments (UEs), mobile stations (MSs), and the like. For convenience of description, the devices mentioned above are all referred to as terminal devices in the embodiments of the disclosure.

The network device 20 is an apparatus deployed in an access network to provide a wireless communication function for the terminal device 10. The network device 20 may include various forms of macro base stations, micro base stations, relay stations, access points and the like. In systems with different wireless access technologies, names of devices with network device functions may be different, for example, in 5th generation mobile communication technology (5G) NR systems, or in new radio-unlicensed (NR-U) systems, the devices with network device functions are called gNodeB or gNB. With the evolution of communication technology, the name "network device" may be changed. For convenience of description in the embodiments of the disclosure, the apparatuses above providing the wireless communication function for the terminal device 10 are all referred to as network devices.

The "5G NR systems" in the embodiments of the disclosure may also be referred to as 5G systems or NR systems, but meanings thereof may be understood by those skilled in the art. The technical solution described in the embodiments of the disclosure may be applicable to the 5G NR systems or the NR-U systems, and may further be applicable to subsequent evolution systems of the 5G NR systems or the NR-U systems.

Before introducing the technical solution in the embodiments of the disclosure, some terms and the art appearing in the embodiments of the disclosure are introduced and explained.

1. Data Repetition Transmission Mechanism.

In order to improve the reliability of data transmission, 3GPP has introduced a data repetition transmission mechanism in NR systems. The data repetition transmission mechanism means that a sending end uses a same symbol allocation scheme in multiple consecutive slots to transmit a same TB many times. When a length of the TB is relatively large, the sending end needs to segment the TB, code each segment of the segmented TB, and put the coded data into a ring buffer. After that, during each transmission process, the sending end performs rate matching on the coded data of TB based on a RV to determine data transmitted to a receiving end in this transmission process.

Furthermore, the data repetition transmission mechanism further defined an aggregation factor for indicating a number of slots that need repeated transmissions. For repeated transmissions of uplink data in a physical uplink shared channel (PUSCH), that is, in case that the sending end is a terminal device, the aggregation factor may be defined as a parameter, pusch-AggregationFactor. In an example, the aggregation factor includes any one of the following: 1, 2, 4, or 8. Optionally, since the aggregation factor configured by a high layer semi-statically, the transmission in each slot adopts a same demodulation reference signal (DMRS) time domain structure.

2. Coding and Mapping in Data Channel.

Uplink data shared channels and downlink data shared channels transmit data in TB as a basic unit. In NR systems, when coding and mapping data, a number of resource elements (REs) for calculating a transport block size (TBS) is determined based on parameters such as a number of orthogonal frequency division multiplexing (OFDM) symbols in one slot indicated by scheduling.

In an example, the number of REs for calculating a TBS is $N_{RS}$=min(156, $N'_{RE}$)·$n_{PRB}$. Here $n_{PRB}$ is a number of resource blocks (RBs) allocated by scheduling;

$$N'_{RE} = N_{sc}^{RB}, N_{symb}^{sh} - N_{DMRE}^{PRB} - N_{oh}^{PRB}, N_{sc}^{RS}$$

is a number of sub-carriers on each RB, $$N_{symb}^{sh}$$

is a number of OFDM symbols in one slot, $$N_{DMRE}^{PRB}$$

is a number of REs occupied by DMRS in each RB, and $$N_{oh}^{PRB}$$

is a overhead RE parameter which is configured by a high layer or fixed.

As may be seen from the above embodiments, only the allocation of OFDM symbols in one slot or a first slot is considered when calculating a TBS, and therefore the method for determining the TBS is unreasonable in case of repeated transmissions in multiple slots. Furthermore, since the calculation of the TBS is based on one slot, in order to obtain a specific bit rate in a coverage limited scenario, more physical resource blocks (PRBs) need to be allocated, resulting in a low resource utilization rate.

3. Multiplexing of Control Channel and Data Channel.

Figure 2:
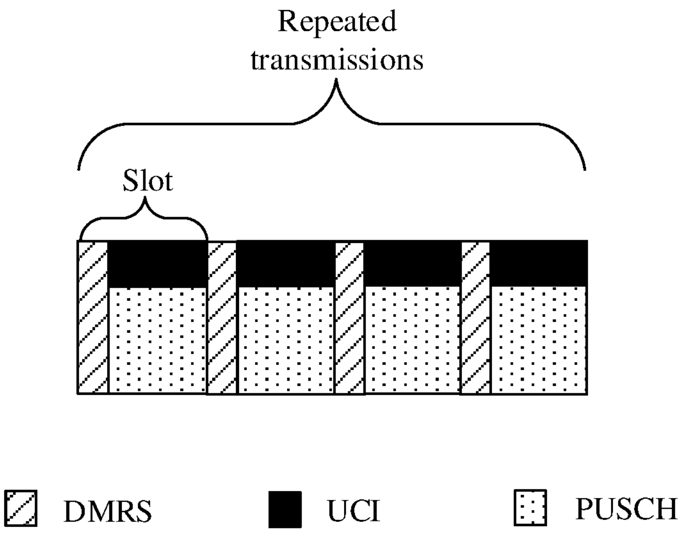
FIG. 2 is a schematic diagram of multiplexing a control channel and a data channel according to an embodiment of the disclosure.

When a data channel (such as an uplink data channel) and a control channel (such as an uplink control channel) are transmitted in a same slot, uplink control information (UCI) is multiplexed onto resources for the data channel (such as RE) through rate matching, as shown in FIG. 2. Therefore, in the data repetition transmission mechanism, a TB is actually transmitted in multiple slots, and if there is a transmission of a control channel in some of the multiple slots for repeated transmissions of the TB, bits to be multiplexed in the slots for the control channel and bit selection, interleaving and mapping for the data channel need to be determined.

Based on the above, the embodiment of the disclosure provides a method for data transmission, which may be used for solving the above technical problems. The technical solution provided by the disclosure is introduced and explained in conjunction with several embodiments.

Figure 3:
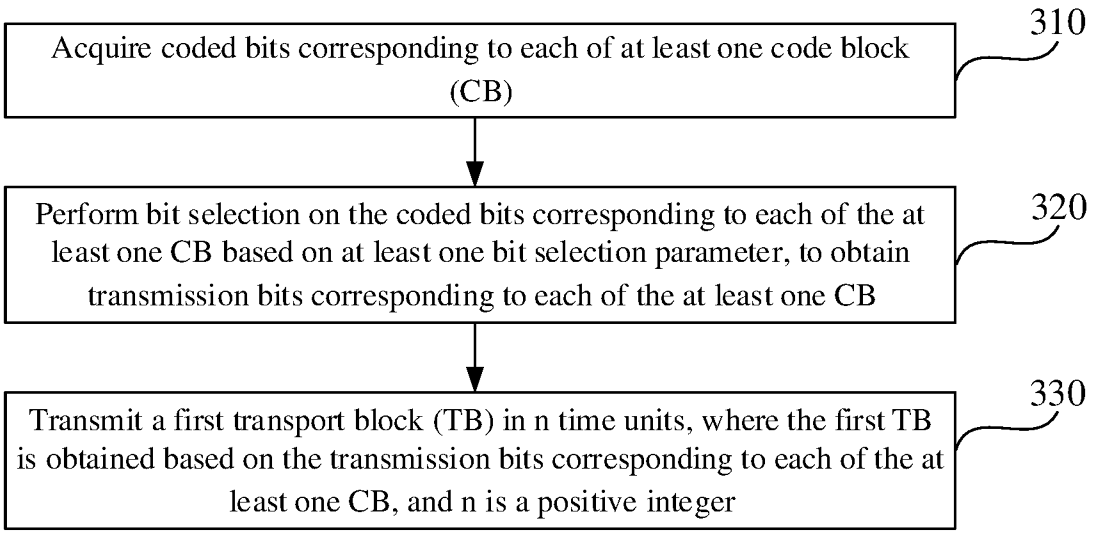
FIG. 3 is a flowchart of a method for data transmission according to an embodiment of the disclosure.

Please refer to FIG. 3, which shows a flowchart of a method for data transmission according to an embodiment of the disclosure. The method for data transmission may be applied to the terminal device 10 shown in FIG. 1 above. The method includes at least part of the following operations 310 to 330.

At 310, coded bits corresponding to each of at least one code block (CB) are acquired.

After coding each of at least one CB, the terminal device may obtain coded bits corresponding to each of the at least one CB. In an embodiment of the disclosure, the terminal device may determine a number of CBs and a size of each CB (i.e., determining each of at least one CB) based on a transport block size (TBS) of a scheduled data channel. Then, the terminal device codes each of the at least one CB based on parameter information such as a determined size of the corresponding CB, to obtain coded bits corresponding to each of at least one CB. It should be understood that "coded bits" may also be referred to as "coded data bits" and the like, and for convenience of description, data bits obtained after coding in the embodiments of the disclosure are referred to as "coded bits".

At 320, bit selection is performed on the coded bits corresponding to each of the at least one CB based on at least one bit selection parameter, to obtain transmission bits corresponding to each of the at least one CB.

During each transmission of the repeated transmissions, the terminal device needs to perform rate matching on each of the at least one CB based on a RV of the transmission, to determine data to be actually transmitted during the transmission. In the embodiment of the disclosure, when the terminal device performs the rate matching on each of the at least one CB, bit selection is performed on the coded bits corresponding to each of the at least one CB based on at least one bit selection parameter, to obtain transmission bits corresponding to each of the at least one CB. Here the bit selection parameter refers to the parameter used in the bit selection. It should be understood that "transmission bits" may also be referred to as "data bits for transmission" and the like, and for convenience of description, data bits obtained after rate matching in the embodiments of the disclosure refer to as "transmission bits".

The embodiment of the disclosure does not limit the manner of bit selection. Assuming that repeated transmissions are performed in n time units and n is a positive integer, then, optionally, the terminal device may perform bit selection in the n time units in combination. Alternatively, the terminal device may perform bit selection for each time unit. Alternatively, the terminal device may perform bit selection in part of the n time units in combination, and perform bit selection for each of remaining time units separately.

The at least one bit selection parameter is/are parameter(s) used in the bit selection, such as a modulation order, a number of REs occupied by a PUSCH, etc. The bit selection parameter may be different based on different bit selection manners. Of course, when the at least one bit selection parameter include multiple parameters, the bit selection parameters may be partially the same and partially different for different bit selection manners, such as the same modulation order and different number of REs occupied by PUSCHs. Alternatively, the bit selection parameters may be completely different. The embodiments of the disclosure are not limited thereto.

For other introductions and explanations about bit selection, at least one bit selection parameter, etc., please refer to the following embodiments and are not repeated here.

At 330, a first transport block (TB) is transmitted in n time units, where the first TB is obtained based on the transmission bits corresponding to each of the at least one CB, and n is a positive integer.

After the terminal device performs rate matching on each of the at least one CB, the first TB is determined based on the transmission bits corresponding to each of the at least one CB. Optionally, the terminal device cascades each of the at least one CB, and performs an interleaving process on the transmission bits corresponding to each of the at least one CB to obtain the first TB. Here, the interleaving process may be performed in each time unit separately, or may be performed in multiple time units in combination, which is not limited in the embodiment of the disclosure. For other introductions and explanations about the interleaving process, please refer to the following embodiments and are not repeated here.

In the embodiment of the disclosure, the terminal device performs repeated transmissions in n time units, and further, the terminal device transmits the first TB in the n time units. Optionally, the n time units are determined based on a semi-static frame structure and an aggregation factor. Based on this, when some of the n time units are canceled by dynamic signaling, rate matching data mapped by the time units is canceled from transmission, but data bit arrangement of other time units is not affected. In an example, the time unit may be implemented as any of the following: a frame, a sub-frame, a slot, a sub-slot, a symbol (such as an OFDM symbol), etc. The implementation of the time unit may be determined in conjunction with actual resource allocation requirements, which are not limited in the embodiments of the disclosure.

In summary, in the technical solution provided by the embodiments of the disclosure, bit selection is performed on data bits of each of at least one coded CB based on at least one bit selection parameter, to obtain data bits to be actually transmitted during each repeated transmission. There are provided a rate matching manner of data for the data repetition transmission mechanism, which ensures that data bits to be transmitted are continuously allocated in multiple time units for the repeated transmissions, and facilitates improving reception and demodulation performance of data.

The bit selection, the at least one bit selection parameter, the interleaving process, etc. are described below.

In an example, the operation 320 includes: for a first CB in the at least one CB, bit selection is performed on coded bits corresponding to the first CB based on the at least one bit selection parameter in the n time units in combination, to obtain transmission bits corresponding to the first CB.

In the example, the terminal device performs bit selection on each CB of the at least one CB in n time units for repeated transmissions in combination. Taking the first CB in the at least one CB as an example, the terminal device performs bit selection on the coded bits corresponding to the first CB based on the at least one bit selection parameter in the n time units in combination, to obtain the transmission bits corresponding to the first CB. Optionally, the at least one bit selection parameter includes at least one of: a number of first REs, a modulation order, or a length ratio.

The length ratio is a ratio of a number of bits before coding corresponding to the first CB to a number of bits before coding corresponding to all CBs in the first TB. The modulation order may indicate a number of bits that may be carried in a modulation symbol. Optionally, a number of the transmission bits corresponding to the first CB is an integer multiple of the modulation order, or the number of the transmission bits corresponding to the first CB is rounded according to the modulation order. In the example, the terminal device performs the bit selection in the n time units in combination, and the number of first REs is a number of all REs occupied by a PUSCH in the n time units.

Based on the example, the operation 330 includes: an interleaving process is performed on the transmission bits corresponding to each of the at least one CB, to obtain the first TB; the first TB is partitioned into n transmission data parts; and each of the n transmission data parts is transmitted in a respective one of the n time units. That is, based on the example, the terminal device performs an interleaving process in the n time units in combination. Optionally, the interleaving process includes a rectangular interleaving process with row writing and column reading. Here a number of rows in the interleaving process may be determined by a number of bits modulated in a symbol.

Figure 4:
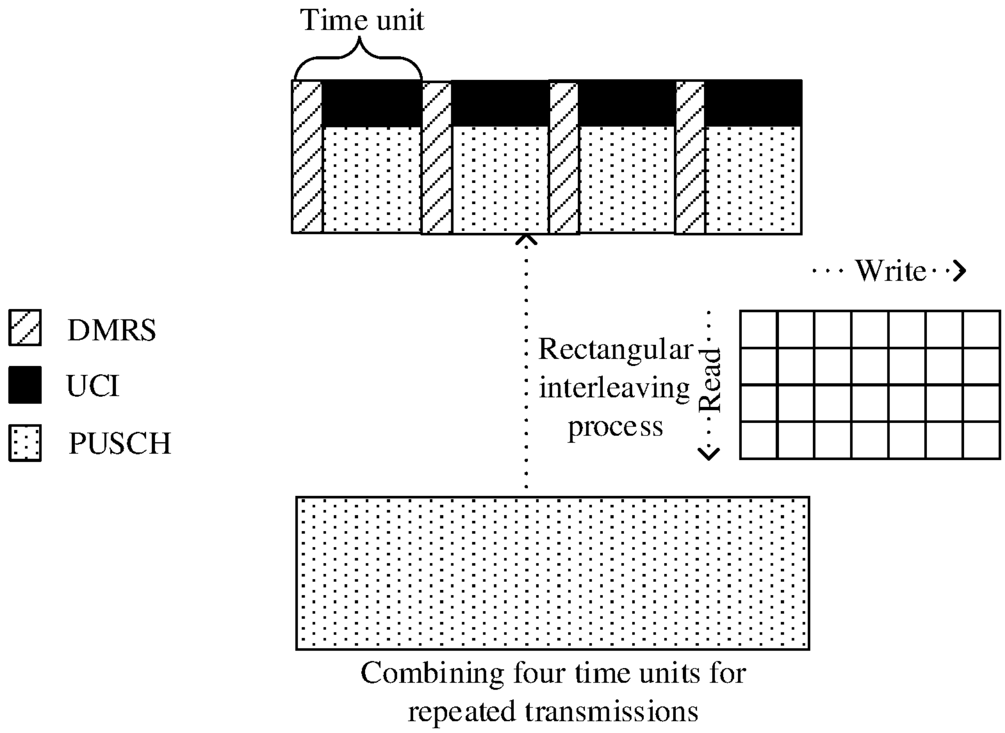
FIG. 4 is a schematic diagram of bit selection and an interleaving process according to an embodiment of the disclosure.

Exemplarily, as shown in FIG. 4, the terminal device performs a rectangular interleaving process with row writing and column reading on transmission bits corresponding to each of the at least one CB transmitted in a PUSCH in four time units for repeated transmissions in combination; and then a TB obtained by the rectangular interleaving process is partitioned to obtain four transmission data parts, and the four transmission data parts are transmitted in a respective one of the four time units.

In an example, the operation 320 includes: for a first CB in the at least one CB, bit selection is performed on coded bits corresponding to the first CB based on the at least one bit selection parameter for a first time unit of the n time units, to obtain transmission bits corresponding to the first CB in the first time unit.

In the example, for each of the n time units for repeated transmissions, the terminal device performs bit selection on each CB of the at least one CB. Taking the first CB in the at least one CB and the first time unit in the n time units as an example, the terminal device performs bit selection on the coded bits corresponding to the first CB based on the at least one bit selection parameter for the first time unit, to obtain the transmission bits corresponding to the first CB in the first time unit. Optionally, the at least one bit selection parameter includes at least one of: a number of second REs, a modulation order, or a length ratio.

The length ratio is a ratio of a number of bits before coding corresponding to the first CB to a number of bits before coding corresponding to all CBs in the first TB. The modulation order may indicate a number of bits that may be carried in a modulation symbol. Optionally, a number of the transmission bits corresponding to the first CB is an integer multiple of the modulation order, or the number of the transmission bits corresponding to the first CB is rounded according to the modulation order. In the example, the terminal device performs the bit selection for each time unit, and takes the first time unit in at least one time unit as an example, the number of second REs is a number of all REs occupied by a PUSCH in the first time units.

Based on the example, taking the first time unit of the n time units for repeated transmissions as an example, the operation 330 includes: an interleaving process is performed on the transmission bits corresponding to each of the at least one CB in the first time unit, to obtain a first transmission data part of the first TB; and the first transmission data part is transmitted in the first time unit. That is, based on the example, the terminal device performs an interleaving process for each time unit. Optionally, the interleaving process includes a rectangular interleaving process with row writing and column reading. Here, a number of rows in the interleaving process may be determined by a number of bits modulated in a symbol.

Figure 5:
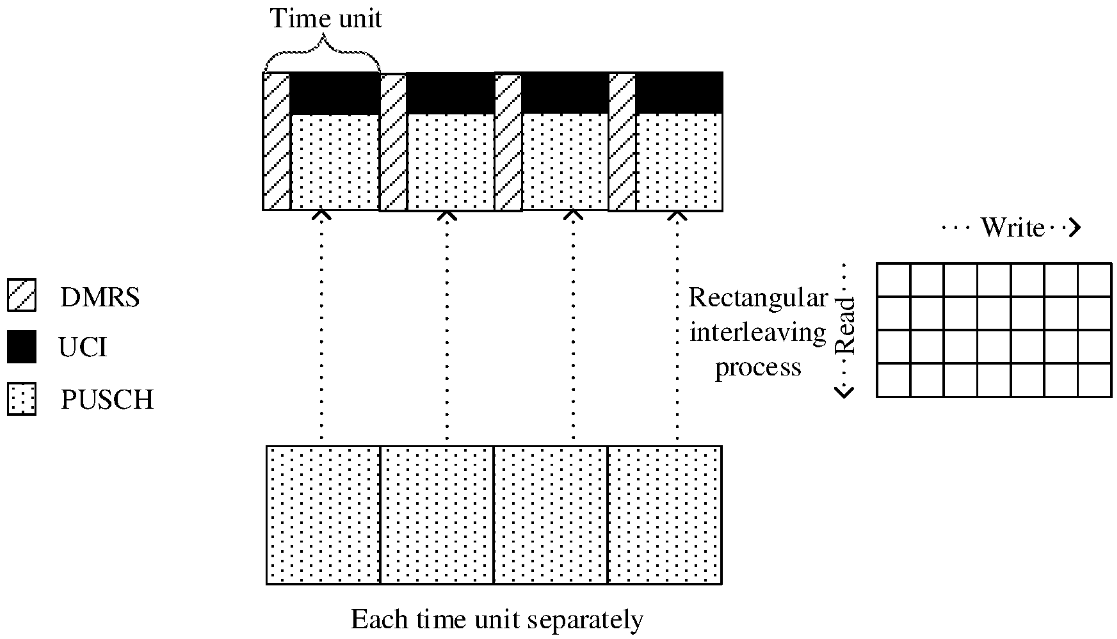
FIG. 5 is a schematic diagram of bit selection and an interleaving process according to another embodiment of the disclosure.

Exemplarily, as shown in FIG. 5, for each of the four time units for repeated transmissions, the terminal device performs a rectangular interleaving process with row writing and column reading on transmission bits corresponding to each of the at least one CB transmitted in a PUSCH in the respective time unit; and then, in each time unit, the terminal device transmits a transmission data part obtained by the rectangular interleaving process in the respective time unit.

In summary, the embodiments of the disclosure provides multiple solutions for rate matching and coding and mapping by performing the bit selection, the interleaving process, etc. in multiple time units for repeated transmissions in combination, or performing the bit selection, the interleaving process, etc. in each of the multiple time units for repeated transmissions separately, thereby realizing a reasonable allocation of transmission bits in multiple time units for repeated transmissions and optimizing data transmission performance.

The multiplexing of the control channel and the data channel is described below.

In an example, the method further includes: for a second time unit of the n time units, multiplexed resources in the second time unit are determined; and UCI is transmitted on the multiplexed resources in the second time unit.

When the data channel and the control channel are transmitted in a same slot, UCI is multiplexed to resources (such as RE) for the data channel by rate matching. Based on this, in the example, the terminal device multiplexes the transmission of the UCI for each of the n time units for repeated transmissions. Taking the second time unit of the n time units for repeated transmissions as an example, the terminal device determines multiplexed resources in the second time unit, and transmits the UCI on the multiplexed resources in the second time unit.

The embodiment of the disclosure does not limit a specific manner of determining the multiplexed resources. Assuming that the multiplexed resources include REs, optionally, taking determination of the multiplexed resources in the second time unit as an example, the terminal device determines a number of REs of the multiplexed resources in the second time unit based on a number of REs occupied by data transmission in the second time unit and a first calculation factor. Exemplarily, the first calculation factor includes a Beta coefficient, and the number of REs of the multiplexed resources in the second time unit=the number of REs occupied by the data transmission in the second time unit*the Beta coefficient. Optionally, a timing sequence of the multiplexed resources in a PUSCH is determined by a last time unit of the n time units for repeated transmissions. Optionally, transmission resources for the first TB are punched by the multiplexed resources.

In the example, since the terminal device multiplexes transmissions of the UCI and the data in the n time units for repeated transmissions, the terminal device may further determine resources for transmitting the data after removing the resources for the UCI multiplexing. That is, in an example, taking the second time unit of the n time units for repeated transmissions as an example, after determining the multiplexed resources in the second time unit, the method further includes: resources occupied by a PUSCH in the second time unit are determined based on resources other than the multiplexed resources in the second time unit.

Figure 6:
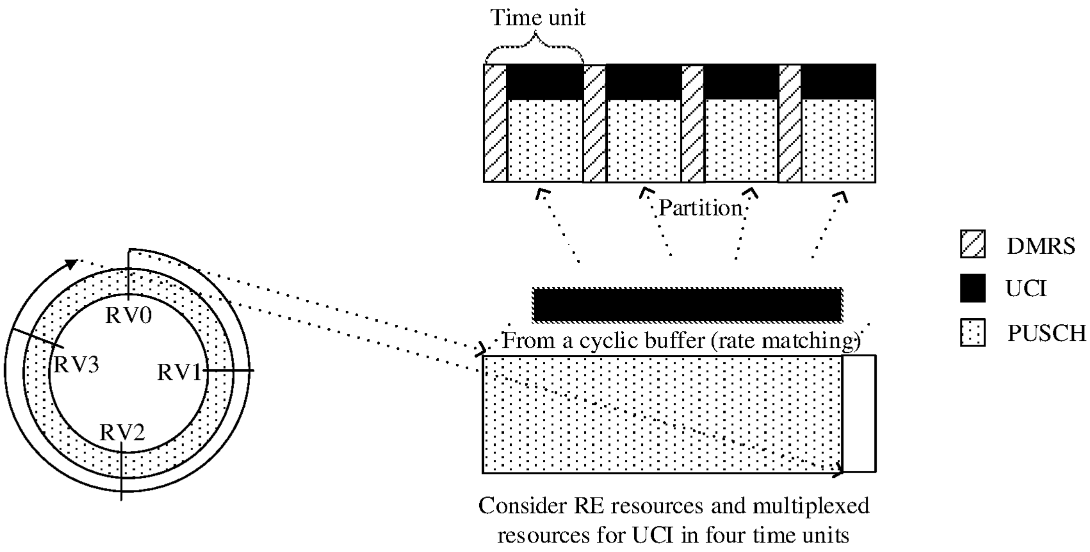
FIG. 6 is a schematic diagram of multiplexing between uplink control information (UCI) and data according to an embodiment of the disclosure.

Exemplarily, as shown in FIG. 6, if the terminal device performs multiplexing of UCI in four time units for repeated transmissions in combination, the terminal device performs rate matching once and considers RE resources and multiplexed resources for the UCI in the four time units during the rate matching process.

Figure 7:
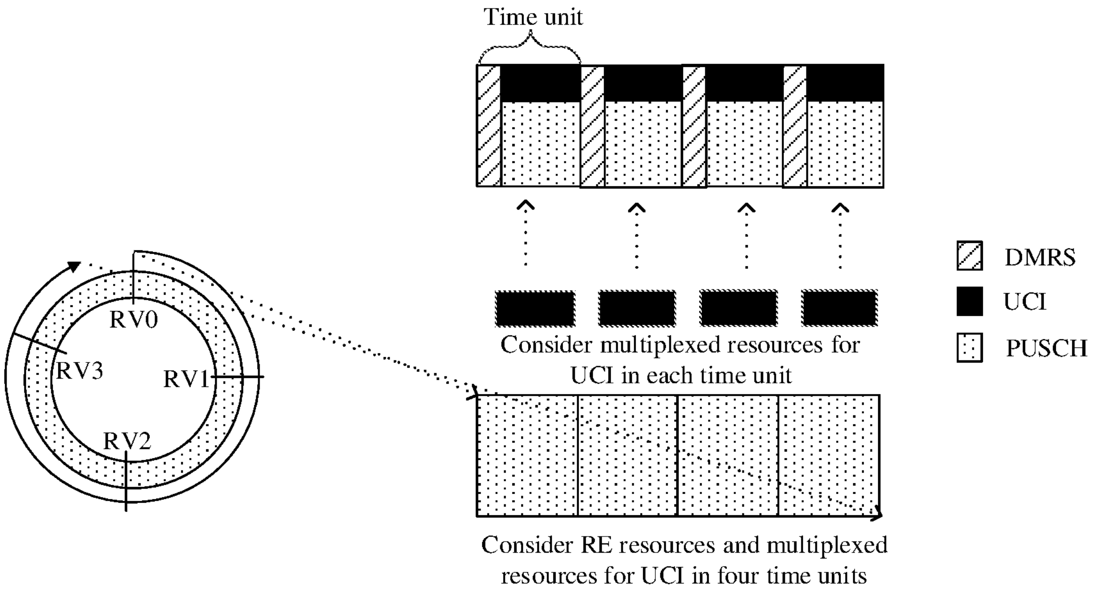
FIG. 7 is a schematic diagram of multiplexing between UCI and data according to another embodiment of the disclosure.

Exemplarily, as shown in FIG. 7, if the terminal device performs multiplexing of UCI for each of the four time units for repeated transmissions, the terminal device performs rate matching twice, the first rate matching considers RE resources and multiplexed resources for the UCI in the four time units, and the second rate matching considers multiplexed resources for the UCI in each time unit.

It should be noted that the embodiment of the disclosure only takes the multiplexing between UCI and data as an example to introduce and explain transmission multiplexing in the data repetition transmission mechanism, and the transmission multiplexing may also be applied to multiplexing between other signals and data, such as multiplexing between pilot signals and data, etc. These multiplexing manners may also increase performance of channel coverage. It should be understood that these multiplexing manners should also fall within the scope of protection of the disclosure.

In summary, the technical solution provided by the embodiments of the disclosure considers the transmission multiplexing of the control channel in the data repetition transmission mechanism, thereby improving a spectrum utilization efficiency during repeated transmissions of data, flexibly applies to the multiplexing between the data channel and the control channel, and improves the performance of channel coverage.

The following are apparatus embodiments of the disclosure, which may be used to execute the method embodiments of the disclosure. For details not disclosed in the apparatus embodiments of the disclosure, please refer to the method embodiments of the disclosure.

Figure 8:
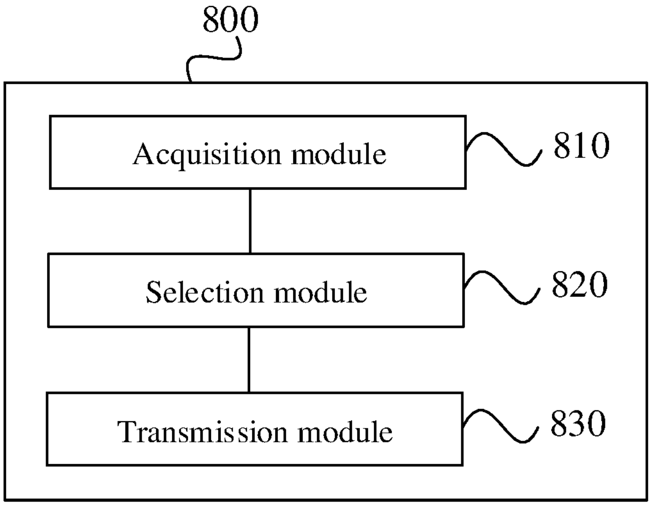
FIG. 8 is a block diagram of an apparatus for data transmission according to an embodiment of the disclosure.

Please refer to FIG. 8, which shows a block diagram of an apparatus for data transmission according to an embodiment of the disclosure. The apparatus has exemplary functions of implementing the above data transmission method, which may be realized by hardware or by hardware executing corresponding software. The apparatus may be the terminal device described above or may be set in the terminal device. As shown in FIG. 8, an apparatus 800 may include: an acquisition module 810, a selection module 820, and a transmission module 830.

The acquisition module 810 is configured to acquire coded bits corresponding to each of at least one code block (CB).

The selection module 820 is configured to perform bit selection on the coded bits corresponding to each of the at least one CB based on at least one bit selection parameter, to obtain transmission bits corresponding to each of the at least one CB.

The transmission module 830 is configured to transmit a first transport block (TB) in n time units, where the first TB is obtained based on the transmission bits corresponding to each of the at least one CB, and n is a positive integer.

In an example, the selection module 820 is configured to: perform, for a first CB in the at least one CB, bit selection on coded bits corresponding to the first CB based on the at least one bit selection parameter in the n time units in combination, to obtain transmission bits corresponding to the first CB.

In an example, the at least one bit selection parameter includes at least one of: a number of first resource elements (REs), a modulation order, or a length ratio; the length ratio is a ratio of a number of bits before coding corresponding to the first CB to a number of bits before coding corresponding to all CBs in the first TB; where the number of first REs is a number of all REs occupied by a physical uplink shared channel (PUSCH) in the n time units.

In an example, the transmission module 830 is configured to: perform an interleaving process on the transmission bits corresponding to each of the at least one CB, to obtain the first TB; partition the first TB into n transmission data parts; and transmit each of the n transmission data parts in a respective one of the n time units.

In an example, the selection module 820 is configured to: perform, for a first CB in the at least one CB, bit selection on coded bits corresponding to the first CB based on the at least one bit selection parameter for a first time unit of the n time units, to obtain transmission bits corresponding to the first CB in the first time unit.

In an example, the at least one bit selection parameter includes at least one of: a number of second resource elements (REs), a modulation order, or a length ratio; the length ratio is a ratio of a number of bits before coding corresponding to the first CB to a number of bits before coding corresponding to all CBs in the first TB; where the number of second REs is a number of all REs occupied by a physical uplink shared channel (PUSCH) in the first time unit.

In an example, the transmission module 830 is configured to: perform an interleaving process on the transmission bits corresponding to each of the at least one CB in the first time unit, to obtain a first transmission data part of the first TB; and transmit the first transmission data part in the first time unit.

In an example, the interleaving process includes a rectangular interleaving process with row writing and column reading.

In an example, a number of transmission bits corresponding to the first CB is an integer multiple of the modulation order.

Figure 9:
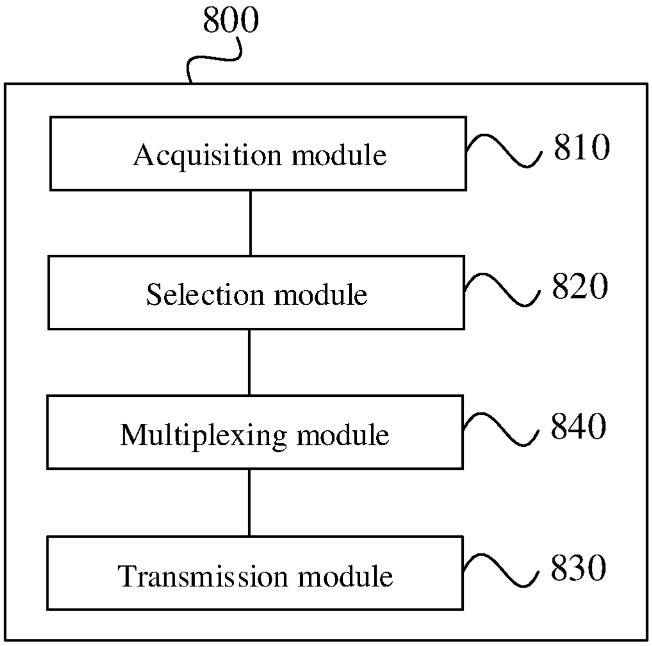
FIG. 9 is a block diagram of an apparatus for data transmission according to another embodiment of the disclosure.

In an example, as shown in FIG. 9, the apparatus 800 further includes a multiplexing module 840 configured to determine, for a second time unit of the n time units, multiplexed resources in the second time unit; and the transmission module 830 is configured to transmit uplink control information (UCI) on the multiplexed resources in the second time unit.

In an example, as shown in FIG. 9, the multiplexing module 840 is further configured to: determine resources occupied by a physical uplink shared channel (PUSCH) in the second time unit based on resources other than the multiplexed resources in the second time unit.

In an example, as shown in FIG. 9, the multiplexing module 840 is configured to: determine a number of resource elements (REs) of the multiplexed resources in the second time unit based on a number of REs occupied by data transmission in the second time unit and a first calculation factor.

In an example, a timing sequence of the multiplexed resources in a physical uplink shared channel (PUSCH) is determined by a last time unit of the n time units.

In an example, transmission resources for the first TB is punched by the multiplexed resources.

In an example, the n time units are determined based on a semi-static frame structure and an aggregation factor.

In summary, in the technical solution provided by the embodiments of the disclosure, bit selection is performed on data bits of each of at least one coded CB based on at least one bit selection parameter, to obtain data bits actually transmitted during each repeated transmission; there are provided a rate matching manner of data for the data repetition transmission mechanism, which ensures that data bits transmitted are continuously distributed in multiple time units for repeated transmissions, and helps to improve reception and demodulation performance of data.

It should be noted that when implementing the functions of the apparatus provided in the embodiment, only the division of each function module is given as an example. In practical applications, the above functions may be assigned to different function modules according to actual needs, that is, the content structure of the device is divided into different function modules to implement all or part of the functions described above.

With regard to the apparatus in the above embodiment, the specific manners in which each module executes operations have been described in detail in the relevant method embodiments and are not explained in detail herein.

Figure 10:
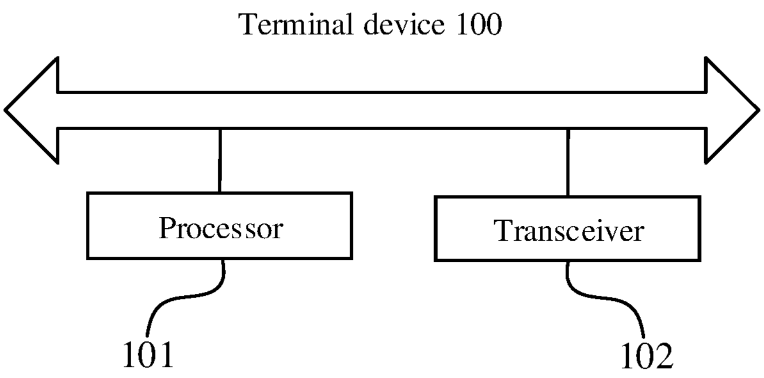
FIG. 10 is a schematic structural diagram of a terminal device according to an embodiment of the disclosure.

Please refer to FIG. 10, which shows a schematic structural diagram of a terminal device 100 according to an embodiment of the disclosure, for example, the terminal device may be configured to execute the above data transmission method. Specifically, the terminal device 100 may include a processor 101 and a transceiver 102 connected to the processor 101.

The processor 101 includes one or more processing cores, and executes various function applications and information processes by running software programs and modules.

The transceiver 102 includes a receiver and a transmitter. Optionally, the transceiver 102 is a communication chip.

In an example, the terminal device 100 further includes a memory and a bus. The memory is connected to the processor through the bus. The memory may be configured to store a computer program, and the processor may be configured to execute the computer program to implement the various operations performed by the terminal device in the method embodiments described above.

Furthermore, the memory may be implemented by any type of transitory or non-transitory storage device, or a combination of them. Transitory or non-transitory storage devices include but are not limited to: a random-access memory (RAM), a read-only memory (ROM), an erasable programmable read-only memory (EPROM), an electrically erasable programmable read-only memory (EEPROM), a flash memory or other solid-state storage technologies, a compact disc read-only memory (CD-ROM), a digital video disc (DVD) or other optical storages, magnetic cassettes, magnetic tapes, magnetic disk storages or other magnetic storage devices.

The processor 101 is configured to acquire coded bits corresponding to each of at least one code block (CB).

The processor is further configured to perform bit selection on the coded bits corresponding to each of the at least one CB based on at least one bit selection parameter, to obtain transmission bits corresponding to each of the at least one CB.

The transceiver 102 is configured to transmit a first transport block (TB) in n time units, where the first TB is obtained based on the transmission bits corresponding to each of the at least one CB, and n is a positive integer.

In an example, the processor 101 is configured to: perform, for a first CB in the at least one CB, bit selection on coded bits corresponding to the first CB based on the at least one bit selection parameter in the n time units in combination, to obtain transmission bits corresponding to the first CB.

In an example, the at least one bit selection parameter includes at least one of: a number of first resource elements (REs), a modulation order, or a length ratio; the length ratio is a ratio of a number of bits before coding corresponding to the first CB to a number of bits before coding corresponding to all CBs in the first TB; where the number of first REs is a number of all REs occupied by a physical uplink shared channel (PUSCH) in the n time units.

In an example, the processor 101 is further configured to: perform an interleaving process on the transmission bits corresponding to each of the at least one CB, to obtain the first TB; partition the first TB into n transmission data parts; and the transceiver 102 is configured to transmit each of the n transmission data parts in a respective one of the n time units.

In an example, the processor 101 is configured to: perform, for a first CB in the at least one CB, bit selection on coded bits corresponding to the first CB based on the at least one bit selection parameter for a first time unit of the n time units, to obtain transmission bits corresponding to the first CB in the first time unit.

In an example, the at least one bit selection parameter includes at least one of: a number of second resource elements (REs), a modulation order, or a length ratio; the length ratio is a ratio of a number of bits before coding corresponding to the first CB to a number of bits before coding corresponding to all CBs in the first TB; where the number of second REs is a number of all REs occupied by a physical uplink shared channel (PUSCH) in the first time unit.

In an example, the processor 101 is further configured to: perform an interleaving process on the transmission bits corresponding to each of the at least one CB in the first time unit, to obtain a first transmission data part of the first TB; and the transceiver 102 is configured to: transmits the first transmission data portion in the first time unit.

In an example, the interleaving process includes a rectangular interleaving process with row writing and column reading.

In an example, a number of transmission bits corresponding to the first CB is an integer multiple of the modulation order.

In an example, the processor 101 is further configured to determine, for a second time unit of the n time units, multiplexed resources in the second time unit; and the transceiver 102 is further configured to transmit uplink control information (UCI) on the multiplexed resources in the second time unit.

In an example, the processor 101 is further configured to determine resources occupied by a physical uplink shared channel (PUSCH) in the second time unit based on resources other than the multiplexed resources in the second time unit.

In an example, the processor 101 is further configured to determine a number of resource elements (REs) of the multiplexed resources in the second time unit based on a number of REs occupied by data transmission in the second time unit and a first calculation factor.

In an example, a timing sequence of the multiplexed resources in a physical uplink shared channel (PUSCH) is determined by a last time unit of the n time units.

In an example, transmission resources for the first TB are punched by the multiplexed resources.

In an example, the n time units are determined based on a semi-static frame structure and an aggregation factor.

An embodiment of the disclosure further provides a computer-readable storage medium, having stored thereon a computer program, the computer program executed by a processor of a terminal device to implement the method for data transmission described above.

An embodiment of the disclosure further provides a chip, including at least one of: a programmable logic circuit, or a program instruction; the chip executed on a terminal device to implement the method for data transmission described above.

An embodiment of the disclosure further provides a computer program product, executed on a terminal device to implement the method for data transmission described above.

The technical solution provided by the embodiments of the disclosure may include the following beneficial effects.

Bit selection is performed on data bits of each of at least one coded CB based on at least one bit selection parameter, to obtain data bits to be actually transmitted during each repeated transmission; there are provided a rate matching manner of data for the data repetition transmission mechanism, which ensures that data bits to be transmitted are continuously allocated in multiple time units for repeated transmissions, and facilitates improving reception and demodulation performance of data.

It may be appreciated by those skilled in the art that in one or more of the above examples, the functions described in the embodiments of the disclosure may be implemented in hardware, software, firmware, or any combination thereof. When implemented in software, these functions may be stored in a computer-readable medium or transmitted as one or more instructions or codes on the computer-readable medium. The computer-readable medium includes a computer storage medium and a communication medium, where the communication medium includes any medium that facilitates transferring computer programs from one place to another. The storage medium may be any available medium accessible to a general-purpose or special-purpose computer.

The above description is only exemplary embodiments of the disclosure and is not intended to limit the disclosure. Any modification, equivalent replacement, improvement, etc. made within the spirit and principles of the disclosure shall be included in the scope of protection of the disclosure.

The invention claimed is:

1. A method for data transmission, comprising:

acquiring coded bits corresponding to each of at least one code block (CB);

performing bit selection on the coded bits corresponding to each of the at least one CB based on at least one bit selection parameter, to obtain transmission bits corresponding to each of the at least one CB; and transmitting a first transport block (TB) in n time units, wherein the first TB is obtained based on the transmission bits corresponding to each of the at least one CB, and n is a positive integer, wherein the at least one bit selection parameter comprises a length ratio; the length ratio is a ratio of a number of bits before coding corresponding to the first CB to a number of bits before coding corresponding to all CBs in the first TB.

2. The method of claim 1, further comprising:

determining, for a second time unit of the n time units, multiplexed resources in the second time unit; and transmitting uplink control information (UCI) on the multiplexed resources in the second time unit.

3. The method of claim 2, wherein after determining the multiplexed resources in the second time unit, the method further comprises:

determining resources occupied by a physical uplink shared channel (PUSCH) in the second time unit based on resources other than the multiplexed resources in the second time unit.

4. The method of claim 2, wherein determining the multiplexed resources in the second time unit comprises:

determining a number of resource elements (REs) of the multiplexed resources in the second time unit based on a number of REs occupied by data transmission in the second time unit and a first calculation factor.

5. The method of claim 2, wherein a timing sequence of the multiplexed resources in a physical uplink shared channel (PUSCH) is determined by a last time unit of the n time units.

6. The method of claim 2, wherein transmission resources for the first TB are punched by the multiplexed resources.

7. The method of claim 1, wherein the n time units are determined based on a semi-static frame structure and an aggregation factor.

8. A terminal device, comprising a processor and a transceiver connected to the processor;

wherein the processor is configured to acquire coded bits corresponding to each of at least one code block (CB);

the processor is further configured to perform bit selection on the coded bits corresponding to each of the at least one CB based on at least one bit selection parameter, to obtain transmission bits corresponding to each of the at least one CB; and the transceiver is configured to transmit a first transport block (TB) in n time units, wherein the first TB is obtained based on the transmission bits corresponding to each of the at least one CB, and n is a positive integer, wherein the at least one bit selection parameter comprises a length ratio; the length ratio is a ratio of a number of bits before coding corresponding to the first CB to a number of bits before coding corresponding to all CBs in the first TB.

9. The terminal device of claim 8, wherein the processor is configured to:

perform, for a first CB in the at least one CB, bit selection on coded bits corresponding to the first CB based on the at least one bit selection parameter in the n time units in combination, to obtain transmission bits corresponding to the first CB.

10. The terminal device of claim 9, wherein the at least one bit selection parameter further comprises at least one of: a number of first resource elements (REs), or a modulation order;

wherein the number of first REs is a number of all REs occupied by a physical uplink shared channel (PUSCH) in the n time units.

11. The terminal device of claim 8, wherein the processor is configured to:

determine, for a second time unit of the n time units, multiplexed resources in the second time unit; and transmit uplink control information (UCI) on the multiplexed resources in the second time unit.

12. The terminal device of claim 11, wherein the processor is further configured to:

determine resources occupied by a physical uplink shared channel (PUSCH) in the second time unit based on resources other than the multiplexed resources in the second time unit.

13. The terminal device of claim 11, wherein the processor is configured to:

determine a number of resource elements (REs) of the multiplexed resources in the second time unit based on a number of REs occupied by data transmission in the second time unit and a first calculation factor.

14. The terminal device of claim 11, wherein a timing sequence of the multiplexed resources in a physical uplink shared channel (PUSCH) is determined by a last time unit of the n time units.

15. The terminal device of claim 11, wherein transmission resources for the first TB are punched by the multiplexed resources.

16. The terminal device of claim 8, wherein the n time units are determined based on a semi-static frame structure and an aggregation factor.

17. A chip, comprising: a programmable logic circuit, and a program instruction; the chip executed on a terminal device to implement a method for data transmission, comprising:

acquiring coded bits corresponding to each of at least one code block (CB);

performing bit selection on the coded bits corresponding to each of the at least one CB based on at least one bit selection parameter, to obtain transmission bits corresponding to each of the at least one CB; and transmitting a first transport block (TB) in n time units, wherein the first TB is obtained based on the transmission bits corresponding to each of the at least one CB, and n is a positive integer, wherein the at least one bit selection parameter comprises a length ratio; the length ratio is a ratio of a number of bits before coding corresponding to the first CB to a number of bits before coding corresponding to all CBs in the first TB.

18. The chip of claim 17, wherein the method further comprises:

determining, for a second time unit of the n time units, multiplexed resources in the second time unit; and transmitting uplink control information (UCI) on the multiplexed resources in the second time unit.

19. The chip of claim 18, wherein after determining the multiplexed resources in the second time unit, the method further comprises:

determining resources occupied by a physical uplink shared channel (PUSCH) in the second time unit based on resources other than the multiplexed resources in the second time unit.

20. The chip of claim 18, wherein determining the multiplexed resources in the second time unit comprises:

determining a number of resource elements (REs) of the multiplexed resources in the second time unit based on a number of REs occupied by data transmission in the second time unit and a first calculation factor.

* * * * *